March 25, 1969 J. GAYNOR ET AL 3,434,835

IMAGE DEPOSITION BY MEANS OF A LIGHT SENSITIVE SOLUTION
CONTAINING ORGANIC HALOFORM COMPOUNDS AND A DYE

Filed Nov. 26, 1965

Inventors:
Joseph Gaynor;
Gordon J. Sewell;
Max Metlay
by John M. Davis
Their Attorney United States Patent Office 3,434,835

Patented Mar. 25, 1969

3,434,835

IMAGE DEPOSITION BY MEANS OF A LIGHT SENSITIVE SOLUTION CONTAINING ORGANIC HALOFORM COMPOUNDS AND A DYE

Joseph Gaynor, Schenectady, Gordon J. Sewell, Albany, and Max Metlay, Schenectady, N.Y., assignors to General Electric Company, a corporation of New York Filed Nov. 26, 1965, Ser. No. 509,915
Int. Cl. G03c 5/40, 5/04
U.S. Cl. 96—35 21 Claims

ABSTRACT OF THE DISCLOSURE

A method of forming a photographic type image on a substrate is described in which the substrate is covered with a liquid solution containing photic reactants, including a photosensitive organic compound such as iodoform, for example, and a dye capable of reacting with the photosensitive organic compound to deposit on the substrate an optically detectable reaction product when the liquid medium is subjected to a pattern of activating radiation. When the deposition has proceeded to the desired extent, the substrate with the deposited layer is separated from the liquid to produce a stable image.

This invention relates to the formation of an image upon a solid surface by a photic reaction at a liquid-solid interface.

In the reproduction of photographic type images upon solid substrates, it would be advantageous to be able to produce such images or image patterns upon surfaces which do not require pretreatment such as, for example, providing such surfaces with a photosensitive surface prior to exposing to an image pattern of light, followed by development. As is well known, such pretreated reproduction media usually require special handling to prevent premature exposure to light as well as dark-room conditions during development. Furthermore, the image to be reproduced can rarely be deposited directly upon substrates such as glass, for example, but must be developed in a coating which is applied to the substrate. These coatings are frequently composed of a relatively soft material, such as a gelatin for example, and require careful handling or some sort of a protective coating which usually has a harmful effect upon image resolution.

It is therefore a principal object of this invention to provide for the reproduction of photographic type images upon solid substrates by means of a photic reaction at the substrate surface.

It is a further object of this invention to provide for the reproduction of photographic type images directly upon solid surfaces which are stable with respect to subsequent exposure to light, tightly adherent and difficult to remove, have very fine detail, continuous tone, and are capable of very high contrast.

Other and specifically different objects of the invention will become apparent from the following disclosure taken with reference to the accompanying drawing wherein.

Briefly stated and in accordance with one embodiment of the invention, the surface of the substrate upon which the photographic type image is to be reproduced is covered with a liquid solution containing photic reactants comprising a polyhalogenated organic compound such as iodoform, for example, and a dye such as indophenol blue, for example. The image pattern desired to be reproduced upon the surface is projected through the liquid and focused upon the surface as a pattern of light and dark areas. The light in areas of the image pattern causes a reaction to take place between the photic reactants and a reaction product forms on the surface of the substrate as a tightly adherent dark film or layer, while no such deposit is formed on areas of the substrate which are not illuminated. The amount of material so deposited is substantially directly proportional to the amount of light to which the reactants are exposed, so that for any given time and intensity of exposure, a projected image pattern of light containing tone or gray scale will produce an image upon the substrate containing an equivalent image pattern containing gray scale, but as the photographic reverse, i.e., if the projected image is a "positive," the deposited image will be a "negative" and vice versa.

Figure 1:
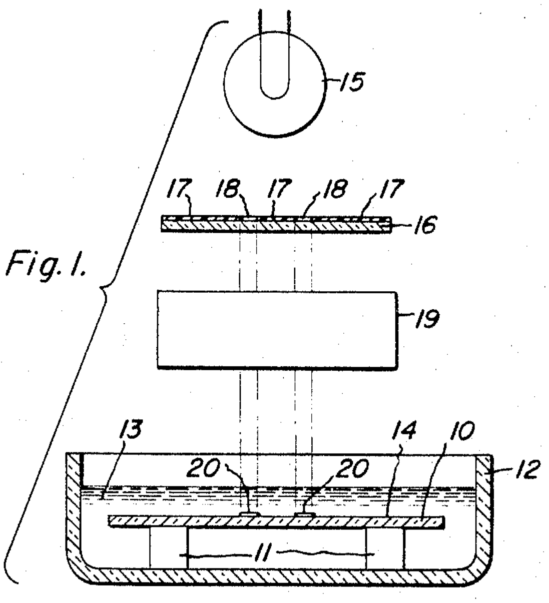
FIGURE 1 is a schematic elevational view with parts broken away of one embodiment of the invention.
Figure 2:
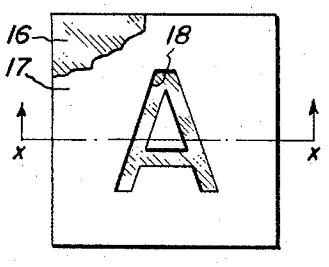
FIGURE 2 is a plan view of one of the members shown in FIGURE 1.
Figure 3:
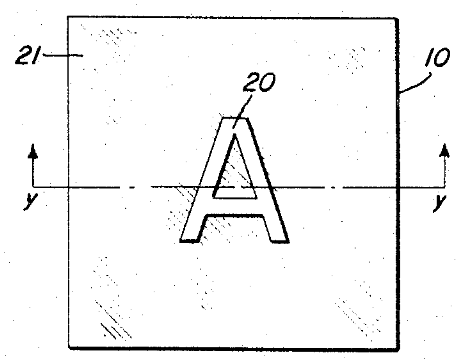
FIGURE 3 is a plan view of another of the members shown in FIGURE 1.

In order to more fully disclose the invention, the following examples will be described in conjunction with reference to the accompanying drawing. A solution was prepared consisting of 5 percent by weight iodoform and 0.5 percent indophenol blue in benzene. A transparent glass plate 10 was supported by props 11 in a horizontal attitude in an open-top container 12 as shown in FIGURE 1. The described solution 13 was added to the container in an amount sufficient to cover the upper surface 14 of plate 20. An image pattern of light was formed by projecting light from a light source 15 through a photographic transparency 16 having opaque areas 17 and light transmissive areas 18 through a lens system schematically shown at 19 and focusing the projected image pattern on the upper surface 14 of plate 10, as shown. As any conventional projector or projection system may be used, the apparatus has been shown in schematic form. A photic reaction begins to occur immediately and continues as long as the illumination is continued, terminating of course when the illumination is stopped or the reactants are exhausted. The rate of the reaction will depend upon such variables as the intensity of the light image, the temperature of the reactants, and the wavelength of the light employed with respect to the reactive components of the solution. As the reaction occurs, a colored image of the illuminated areas of the light image patterns forms as a tightly adherent opaque deposit or film upon surface 14. The more perfectly the image pattern is focused upon surface 14, the sharper will be the image deposited and the greater its resolution will be. While the deposited image has been characterized as being formed of areas which are "opaque," it will be recognized that this is a relative term. The degree of opacity of the deposited film will depend upon many factors such as temperature, concentration of reactants, time of exposure, intensity of radiation and the particular reactants employed. Indeed, under certain conditions the deposited film may not be detectable by the unaided eye but may require suitable optical instrumentation in order to be resolved. For this reason, the deposit or film may be more generically characterized as optically detectable or optically sensible, As previously pointed out, the deposited image is the photographic reverse of the projected image pattern. This is shown schematically in FIGURES 2 and 3, wherein the photographic transparency 16 shown in cross section in FIGURE 1 is shown in plan view in FIGURE 2. As shown in FIGURE 2, the background area 17 is opaque and the area comprising the block letter A, reference numeral 18, is transparent. The transparent areas 18 of FIGURE 1 are those areas of the block letter cut by plane X—X. FIGURE 3 is a plan view of plate 10 which is shown in section in FIGURE 1 taken along plane Y—Y of FIGURE 3. As shown, the block letter A is reproduced on upper surface 14 of plate 10 as an opaque deposit 20 and background 21 is unaffected in this case, transparent.

After the desired amount of deposit is accumulated, plate 10 is removed from the solution, rinsed, and dried. The deposit is tightly adherent and light stable.

Figure 4:
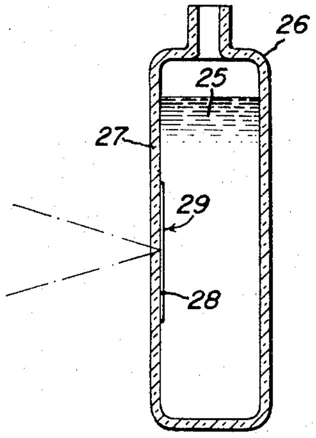
FIGURE 4 is a schematic elevational view with parts broken away of another embodiment of the invention.

Another adaptation of the invention permits the formation of such an image on the interior of transparent containers such as glass bottles, as schematically illustrated in FIGURE 4. As shown, the photoreactive solution 25 is placed in a glass bottle or similar container 26 and the light image focused through the side wall 27 upon the inner surface 28 of side wall 27, as shown. The image pattern is deposited as a layer or film 29 upon the interior surface 28 of the side wall 27 as shown. It will thus be seen that a means is provided for producing a label or identifying marking on the interior of a glass container which is tamper-proof and is not subject to physical destruction by casual or intentional outside abrasion. Obviously, if the highest quality of image reproduction is desired, side wall 27 must be substantially flat and of a substantially constant thickness. However, it will occur to those skilled in the art that instead of a projected image, an externally applied stencil may be used, in which case glass bottles or similar containers of virtually any shape or configuration may be employed, but a lower resolution may result. Obviously, if the material which is to be packaged in the glass container tends to react either chemically or physically with the deposited film, the image may be protected by an overlying film of a non-reactive material.

Useful polyhalogenated organic compounds for formation of images according to the invention may be selected from the broad class of photosensitive organic compounds containing at least two halogen atoms bonded to at least one carbon atom which produce chemically reactive species in the dispersing medium when exposed to activating photoradiation. The preferred polyhalogenated organic compounds may be further characterized structurally as having a plurality of halogen atoms bonded to the same carbon atom for greater reactivity in the desired production of chemically reactive species upon photoradiation. Photolytic polyhalogen-containing compounds are known and include such diverse chemical compositions as polyhalogen-substituted alkyl hydrocarbons, for example, iodoform, methylene iodide, a tetraiodoethylene; mononuclear polyhalogenated aromatic compounds such as chloranil; and alicyclic polyhalogenated organic compounds such as tetraiodocyclohexane. Under some conditions, mixtures of these compounds may be desirable. Especially preferred polyhalogenated organic compounds are halogen-substituted alkyl hydrocarbons which are readily soluble in organic solvents and suspending media used for the invention to permit molecular dispersion of the material for greater resolution capability in recording. The preferred materials are also generally sensitive to photoradiation in the visible spectrum so as to permit the use of ordinary sources of illumination. The preferred polyhalogenated alkyl hydrocarbons exhibit faster response to illumination generally and for a given period of exposure, also generally yield an image having more gray scale than other polyhalogenated organic compounds mentioned. Iodoform is an especially preferred material which exhibits all of the aforementioned desirable characteristics as well as being less volatile than many other polyhalogenated organic compounds. The latter characteristic minimizes loss of the light-sensitive agent during storage of the recording liquid before use.

Useful organic dyes for the present recording compositions can be characterized generally as colored materials which when dispersed in a dye receptive medium, together with a polyhalogenated organic compound, impart general coloration to the entire medium subject to selective color change upon photoradiation. The dye material itself may be further characterized consistent with the preceding description as a colored organic compound which may undergo a reaction with the chemically reactive species generated in the recording medium to produce an adherent, opaque reaction product on a liquid-solid interface.

While the exact mechanism of the present photochemical conversion is not known with precision at the present time, the nature of the reaction may involve a reaction between the chromophore and/or auxochrome groups on the dye material and photolytic halogen to produce an irreversible oxidation product. However, as stated, the exact nature of the reaction is not known and may be quite different from that postulated.

Useful organic dyes having the aforementioned desirable characteristics can be selected from the broad class of chromogens which are colored by molecular absorption of light including triphenylmethane dyes such as brilliant green and erioglaucine; azo dyes such as p-phenyl azoaniline, dimethyl p-phenyl azoaniline, methyl red, and methyl orange; anthraquinone dyes usch as quinalizarine and alizarine red S; thiazine dyes such as methylene blue; quinoline dyes such as pinacyanol; xanthene dyes such as rose bengal and erythrosine; merocyanine and cyanine dyes; indophenol dyes; an indigo. The indophenol and merocyanine dyes are preferred as having a faster response to the activating photoradiation than the other classes of dye compositions mentioned together with a broader spectral response region which includes the visible spectrum. On the other hand, the spectral sensitivity of such dyes generally may be increased without loss of desirable characteristics in the recording composition by incorporation therein of effective amounts of such known photosensitizers as diphenylamine, dimethylaniline, and other organic base materials.

The concentrations of the various materials employed in the practice of the invention are not particularly critical, but sufficient reactants must be present so that the reaction may produce an image of the desired density in a reasonable time. Where solutions of the reactants in an appropriate solvent are employed, the upper limit of concentration of the reactants will obviously depend upon the solubilities of the materials employed with respect to the particular solvent or solvent system used. Also, where, as shown in FIGURE 1, the activating radiation must pass through the solution, higher concentrations of some dyes employed may increase the opacity of the solution to an undesirable degree and hence lower concentrations would be used. It should be noted at this point that while all the dyes employed are readily soluble in the solvents, as indicated previously, some of the polyhalogenated reactants are not. If concentrations of the polyhalogenated materials are desired which are greater than their respective solubility limits, they may be present as a suspension of very fine particles in the solvent, provided a good and uniform dispersion is achieved and maintained during the reaction.

While for the purposes of providing a complete disclosure of working examples glass substrates have been particularly described, it will be appreciated that other solid substrates may be used. For example, in the form of the invention shown in FIGURE 1, substrate 10 need not be transparent. Furthermore, it may be composed of any suitable material such as a plastic which is not soluble in the solvent, or metal, or ceramic or the like. Yet further, while the embodiment of the invention shown in FIGURE 1 shows image deposition on a single, unitary rigid substrate 10, it will be appreciated by those skilled in the art that a flexible tape might be used as a substrate and incrementally advanced through the reactive fluid so as to produce images thereon in a manner analogous to the "frames" produced on conventional motion picture film, for example. Many diverse applications of the invention will readily occur to those skilled in the art. In addition to labeling, as previously described, the invention may be useful in selective etching processes, information recording, duplication and many other applications too numerous to mention.

From all the foregoing, it will be seen that this invention provides a novel means to produce an image upon a solid surface by a photic reaction at a liquid-solid interface. While certain specific examples have been recited, it will be apparent to those skilled in the art that there are many possible variations within the purview of the invention which have not been specifically set forth. Therefore, the scope of this invention is not intended to be limited to only those examples recited, but by the appended claims.

What we claim as new and desire to secure by Letters Patent of the United States is:

1. The method of forming an adherent, optically detectable deposit upon a solid substrate comprising the steps of:

(a) forming a liquid-solid interface between a surface of said substrate and a liquid comprising a dispersing medium containing effective amounts of a photosensitive organic compound containing at least two halogen atoms which produce chemically reactive species in the dispersing medium when exposed to activating radiation, said compound being selected from the group consisting of polyhalogen substituted alkyl hydrocarbons, mononuclear polyhalogenated aromatic compounds, alicyclic polyhalogenated organic compounds and mixtures thereof and an organic dye which is capable of reacting with said reactive species to produce an adherent optically detectable reaction product on said solid substrate surface at said liquid-solid interface and selected from the group consisting of triphenylmethane dyes, azo dyes, anthraquinone dyes, thiazine dyes, quinoline dyes, xanthene dyes, merocyanine dyes, cyanine dyes, indophenol dyes and indigo, (b) exposing said liquid-solid interface to activating radiation to cause said reaction and deposition to take place, and (c) separating the substrate and deposited reaction product from the liquid to terminate the deposition and provide a stable deposited layer.

2. The method recited in claim 1 in which said adherent optically detectable deposit is in the form of an image formed upon the surface of said substrate which is produced by an image pattern of said activating radiation in the form of light and dark areas, said deposited image having a point-to-point correspondence with said image pattern.

3. The method of claim 1 in which said photosensitive compound is iodoform.

4. The method of claim 1 in which said photosensitive compound is methylene iodide.

5. The method of claim 1 in which said photosensitive compound is tetraiodoethylene.

6. The method of claim 1 in which said photosensitive compound is chloranil.

7. The method of claim 1 in which said photosensitive compound is tetraiodocyclohexane.

8. The method of claim 1 in which said organic dye is the triphenylmethane dye brilliant green.

9. The method of claim 1 in which said organic dye is the triphenylmethane dye erioglaucine.

10. The method of claim 1 in which said organic dye is the azo dye p-phenyl azoaniline.

11. The method of claim 1 in which said organic dye is the azo dye dimethyl p-phenyl azoaniline.

12. The method of claim 1 in which said organic dye is the azo dye methyl red.

13. The method of claim 1 in which said organic dye is azo dye methyl orange.

14. The method of claim 1 in which said organic dye is the anthroquinone dye quinalizarine.

15. The method of claim 1 in which said organic dye is the anthroquinone dye alizarine red S.

16. The method of claim 1 in which said organic dye is the thyazine dye methylene blue.

17. The method of claim 1 in which said organic dye is the quinoline dye pinacyanol.

18. The method of claim 1 in which said organic dye is the xanthene dye rose bengal.

19. The method of claim 1 in which said organic dye is the xanthene dye erythrosine.

20. The method of claim 1 in which said organic dye is the indophenol dye indophenol blue.

21. The method of claim 1 in which said organic dye is indigo.

References Cited

UNITED STATES PATENTS 3,114,635 12/1963 Fidelman ---------- 96—90 XR

NORMAN G. TORCHIN, *Primary Examiner.*

J. R. EVERETT, *Assistant Examiner.*

U.S. Cl. X.R.

96—90, 119